Feb. 22, 1966 A. R. KAYE 3,237,110

TELEVISION SYNC SEPARATOR CIRCUIT WITH MISSING PULSE DETECTOR CONTROLLING INPUT REFERENCE LEVEL

Filed Sept. 10, 1963 2 Sheets-Sheet 1

United States Patent Office 3,237,110

Patented Feb. 22, 1966

3,237,110

TELEVISION SYNC SEPARATOR CIRCUIT WITH MISSING PULSE DETECTOR CONTROLLING INPUT REFERENCE LEVEL

Alan R. Kaye, Ottawa, Ontario, Canada, assignor to Northern Electric Company Limited, Montreal, Quebec, Canada Filed Sept. 10, 1963, Ser. No. 307,873
10 Claims. (Cl. 328—139)

This invention relates to improvements in sync separator circuits for television receivers, whether domestic or of the type provided in a studio for receiving an outside signal or a networked program.

More specifically the invention is concerned with sync separator circuits of the type that rely for operation on the maintenance of a charge on a capacitor to establish a voltage level as a reference for sync pulse separation.

Figures 1, 2, 3A, 3B, 3C, 3D, 4:
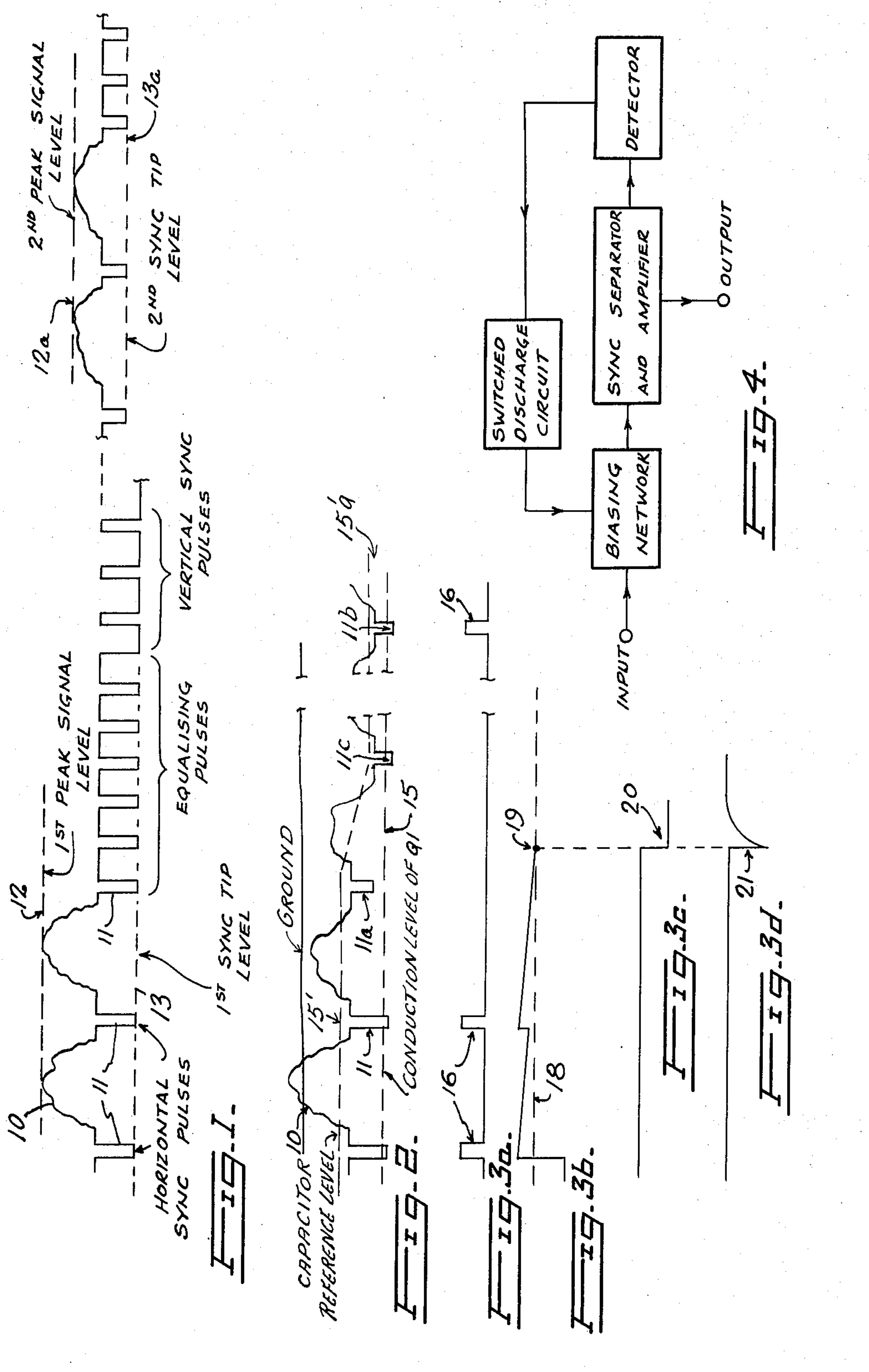
Figure 5:
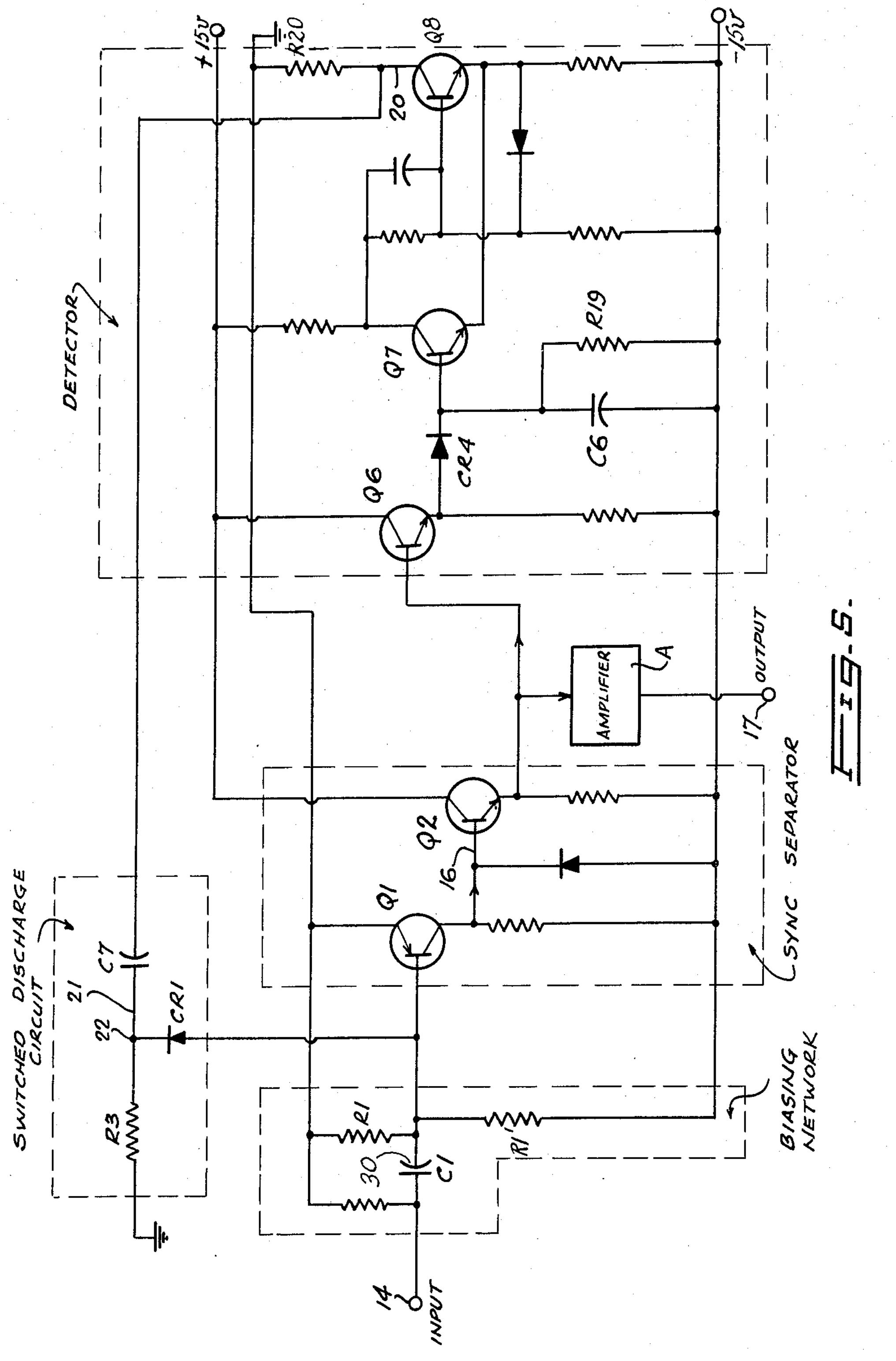

The invention, both in its general aspects and its specific form, will best be understood after a preliminary discussion of the accompanying drawings in which, FIGURE 1 shows a typical composite television signal, FIGURES 2 and 3*a* to 3*d* show further signals, FIGURE 4 is a block diagram of a circuit according to the invention, and FIGURE 5 is a preferred form of a more detailed circuit according to the invention.

The typical composite televison signal shown in FIGURE 1 contains the picture signals 10 and various sync and equalising pulses 11. For present purposes the equalising pulses are considered to constitute sync pulses. While the composite signal remains of substantially constant strength the tips of the picture signals 10 define a first peak signal level 12, and those of the sync pulses define a first sync tip level 13. Whenever a sudden change in signal strength occurs, as when switching from one input signal to another, for example, these tip levels move to the second positions shown at 12*a* and 13*a* on the right hand side of FIGURE 1.

To appreciate the effect on sync separation of such a sudden change of level, reference should be made to the left hand portion of FIGURE 5 where a typical sync separation circuit is illustrated, such circuit including a capacitor C1 having a plate 30 connected to resistors R1 and R1′ of a biasing network and to the base of a transistor Q1. No current flows out of the base of transistor Q1 until a small negative threshold voltage, illustrated as conduction level 15 in FIGURE 2, has been achieved on the base relative to the emitter. The base current then increases rapidly with voltage, since the input impedance to the transistor is low. Corresponding base and collector currents then flow. When the composite signal of FIGURE 1 is applied at the input 14, the transistor Q1 conducts when the signal voltage goes more negative than the conduction level 15, that is during sync pulses. The base current builds up a charge on capacitor C1, causing plate 30 to become more positive. This charge leaks away through the parallel combination of resistors R1 and R1′ (assumed to have an equivalent parallel resistance R) in the intervals between sync pulses. The value of resistance R is much higher than the input impedance of transistor Q1, so that the charge accumulates until a steady mean voltage is developed across capacitor C1, this voltage being such that the charge leaking away between pulses equals that accumulated during pulses. The equilibrium condition will be stable because the charging current, which at first is larger than the discharging current, decreases as the voltage on the capacitor C1 increases, while the discharging current increases with such voltage.

Collector current only flows in transistor Q1 each time more charge is added to the capacitor C1 and thus follows the sync pulses to achieve their separation from the composite signal. The time constant C1R of the capacitor-resistor combination has to be made comparatively long to minimise the effect of the greater length of the vertical sync pulses than the horizontal sync pulses. In practice it will be much longer than the vertical period of 1/60 second.

The mean voltage on capacitor C1 is represented as the reference 15′ in FIGURE 2. As is usual in sync separators, the composite input signal is superimposed on this reference voltage 15′, the latter thus constituting the A.C. axis of the input signal. When a sudden reduction of signal strength occurs, the next sync pulse 11*a* fails to reach the level 15 and no base or collector currents flow through the transistor Q1. As a result no output pulse 16 (FIG. 3*a*) occurs, and this condition persists until sufficient charge has leaked away from capacitor C1 for conduction to recommence, that is at pulse 11*b* shown on the right hand side of FIGURE 2. Due to the long time constant C1R, this delay is appreciable, and during all this time there is a gap in the output pulses 16 from the sync separator.

The object of the present invention is to provide means for minimising this undesirable effect by reducing the gap in sync pulses to as short a time as possible.

This object is achieved according to the invention by providing a detector connected to the output of the sync separator to detect the first missing sync pulse. What the detector in fact detects is not the absence of sync pulses (these are absent under normal conditions between pulses), but the prolongation of the time interval since the last sync pulse, or, in other words, the prolongation of the periodicity of the sync pulses.

The detector, upon detecting such a prolongation, emits a switching pulse which is fed to a discharge circuit to trigger the same (FIG. 4). The discharge circuit is connected to the capacitor C1 to provide a discharge path therefor. In this way the reference voltage on the capacitor C1 is comparatively rapidly reduced, as shown at 15*a* in FIGURE 2, so that the next sync pulse 11*c* reaches the reference voltage and triggers the transistor Q1. As a result only one sync pulse is missed.

This circuit arrangement of the invention is illustrated in block form in FIGURE 4. Examples of specific circuits that may be employed as the detector and as the switched discharge circuit are illustrated in FIGURE 5 to which reference will now be made.

The output pulses 16 from the transistor Q1 (the inverted sync waveform) are fed through a conventional emitter follower Q2 and a conventional amplifier A to the output 17. They also pass from the emitter follower Q2 to the detector, the first stage of which comprises a further emitter follower Q6, the output of which is peak-rectified by a circuit consisting of rectifier CR4, capacitor C6 and resistor R19. The waveform thus presented to the base of next transistor Q7 is shown in FIGURE 3*b*. Transistors Q7 and Q8 form a Schmitt trigger circuit, the property of which is that, provided the base of transistor Q7 is held above a predetermined potential 18 (set by the circuit values), transistor Q7 is always switched on and transistor Q8 is always switched off. Whenever the base of transistor Q7 falls below the potential 18, as when the sync pulse periodicity is prolonged, these states are reversed, transistor Q7 switching off and transistor Q8 switching on.

Transistor Q8 thus switches on at point 19 to produce a negative going pulse 20 (FIGURE 3*c*) at its collector. This pulse is fed to a switched discharge circuit containing a capacitor C7 and resistor R3 in series, thus generating the negative spike 21 (FIGURE 3*d*) at point 22.

This negative spike 21 momentarily forward biases a rectifier CR1 (which is normally reverse biased). Rectifier CR1 then conducts, allowing capacitor C1 to discharge through capacitor C7 and resistor R20. This action takes place within the period of one line scan so that the level 15′ is quickly readjusted to a value permitting separation before the next sync pulse arrives (15′a in FIGURE 2).

The value of capacitor C7 will determine the rate and amount of discharge of capacitor C1 during this correcting action. Too high a value for capacitor C7 changes the bias of capacitor C1 too much, possibly causing the blanking signal to be separated and possibly introducing an objectionable transient into the output by switching on transistor Q1 when spike 21 occurs. Too small a value for capacitor C7 will result in too slow a discharge of capacitor C1, with the result that more than one sync pulse will be lost. Many factors affect the choice of the value of capacitor C7, including the video signal amplitude, and it is best determined experimentally. In general the value of capacitor C7 will be about ten times smaller than that of capacitor C1.

As will be apparent, the details of the sync separator circuit itself, or of the detector or the switched discharge circuit may be varied as desired, the invention residing in the combination of these circuits whereby a missing sync pulse is immediately detected and action is taken rapidly to readjust the bias level of a capacitor the voltage across which fundamentally controls the separation process.

I claim:

1. In a television receiving circuit,
(a) a synch separator comprising,
(i) input means for receiving a composite signal,
(ii) a capacitor connected to said input means,
(iii) charging and discharging means connected to said capacitor for charging the same during receipt of sync pulses and for discharging the same at a first relatively slow rate between sync pulses to set up a substantially steady mean reference voltage across said capacitor,
(iv) and output means connected to said charging and discharging means and sensitive to such charging steps for emitting output pulses corresponding to separated sync pulses,
(b) detector means connected to said output means for detecting prolongation of the periodicity of said output pulses, said detector means including trigger means for emitting a switching pulse upon such detection,
(c) and discharge means connected to said trigger means and to said capacitor and responsive to a said switching pulse, for discharging said capacitor at a second rate substantially faster than said first rate, for rapid readjustment of said reference voltage upon receipt of a said switching pulse.

2. In a television receiving circuit,
(a) a sync separator comprising:
(i) input means for receiving a composite signal,
(ii) a capacitor connected to said input means,
(iii) charging and discharging means connected to said capacitor for charging the same during receipt of sync pulses and for discharging the same at a first relatively slow rate between sync pulses to set up a substantially steady mean reference voltage across said capacitor,
(iv) and output means connected to said charging and discharging means and sensitive to such charging steps for emitting output pulses corresponding to separated sync pulses,
(b) a detector connector to said output means for detecting prolongation of the periodicity of said output pulses and for emitting a switching pulse upon such detection, said detector comprising
(i) means for peak rectifying said output pulses,
(ii) and a trigger circuit connected to said peak rectifying means for emitting said switching pulse upon the level of the output from said peak rectifying means falling below a predetermined value,
(c) and discharge means connected to said trigger circuit and to said capacitor and responsive to a said switching pulse, for discharging said capacitor at a second rate substantially faster than said first rate, for rapid readjustment of said reference voltage upon receipt of a said switching pulse.

3. A circuit according to claim 2, wherein said discharge means comprises
(d) a series capacitor-resistor circuit for generating a voltage spike upon receipt of said switching pulse,
(e) a rectifier and means reverse biassing said rectifier, said rectifier having one terminal connected to said first mentioned capacitor and being connected to receive said spike at its other terminal to overcome said bias to provide a path for discharge of said first mentioned capacitor through said rectifier and through said capacitor-resistor circuit at a rate determined by the relative values of said capacitors.

4. In a television receiving circuit,
(a) a sync separator comprising
(i) a capacitor,
(ii) a transistor having emitter, base and collector electrodes, said base electrode being connected to said capacitor and the other electrodes of said transistor being biassed to pass base and collector currents upon application of a voltage greater than a selected conduction voltage to said base,
(iii) input means connected to said capacitor for receiving and applying a composite signal through said capacitor to said base to pulse said base by a sync pulse of voltage greater than said conduction voltage, whereby to charge said capacitor during receipt for sync pulses,
(iv) a resistor connected to said capacitor for discharging the same at a first relatively slow rate between sync pulses, whereby to set up a substantially steady mean reference voltage across said capacitor,
(v) and output means connected to said transistor and sensitive to collector current therethrough for emitting output pulses corresponding to separated sync pulses,
(b) detector means connected to said output means for detecting prolongation of the periodicity of said output pulses, said detector means including trigger means for emitting a switching pulse upon such detection,
(c) and discharge means connected to said trigger means and to said capacitor and responsive to a said switching pulse, for discharging said capacitor at a second rate substantially faster than said first rate, for rapid readjustment of said reference voltage upon receipt of a said switching pulse.

5. In a television receiving circuit,
(a) a sync separator comprising
(i) a capacitor,
(ii) a transistor having base, emitter and collector electrodes, said base electrode being connected to said capacitor and the other electrodes of said transistor being biassed to pass base and collector currents on application of a voltage greater than a selected conduction voltage to said base,
(iii) input means connected to said capacitor for receiving and applying a composite signal through said capacitor to said base to pulse said base by a sync pulse of voltage greater than said conduction voltage, whereby to charge said capacitor during receipt of sync pulses,
(iv) a resistor connected to said capacitor for discharging the same at a first relatively slow rate between sync pulses, whereby to set up a substantially steady mean reference voltage across said capacitor, (v) and output means connected to said transistor and sensitive to collector current therethrough for emitting output pulses corresponding to separated sync pulses, (b) a detector connected to said output means for detecting prolongation of the periodicity of said output pulses and for emitting a switching pulse upon such detection, said detector comprising (i) means for peak rectifying said output pulses, (ii) and a trigger circuit connected to said peak rectifying means for emitting said switching pulse upon the level of the output from said peak rectifying means falling below a predetermined value, (c) and discharge means connected to said trigger circuit and to said capacitor and responsive to a said switching pulse, for discharging said capacitor at a second rate substantially faster than said first rate, for rapid readjustment of said reference voltage upon receipt of a said switching pulse.

6. A circuit according to claim 5, wherein said discharge means comprises (d) a series capacitor-resistor circuit for generating a voltage spike upon receipt of said switching pulse, (e) a rectifier and means reverse biassing said rectifier, said rectifier having one terminal connected to said first mentioned capacitor and being connected to receive said spike at its other terminal to overcome said bias to provide a path for discharge of said first first mentioned capacitor through said rectifier and through the capacitor of said capacitor-resistor circuit at a rate determined by the relative values of said capacitors.

7. In a television receiving circuit, (a) a sync separator comprising (i) a transistor having base, emitter and collector electrodes, (ii) means biasing said transistor to conduct upon application of a voltage greater than a selected conduction level to said base, (iii) a capacitor connected to said base, (iv) means for maintaining a substantially steady first reference voltage across said capacitor, said means comprising (1) input means connected to said capacitor, for receiving and applying through said capacitor to said base a composite signal superimposed on said first reference voltage, said composite signal including a train of sync pulses, the voltage of a said sync pulse superimposed on said first refererence voltage being greater than said conduction level, whereby to cause said transistor to conduct and charge said capacitor during receipt of said sync pulses, (2) resistance means connected to said capacitor for discharging the same at a first relatively slow rate between sync pulses, (v) and output means connected to said transistor and sensitive to collector current therethrough for emitting output pulses corresponding to separated sync pulses, (b) detector means connected to said output means for detecting prolongation of the periodicity of said output pulses consequent upon a sudden shift of sync pulses to a level such that the voltage of such shifted sync pulse superimposed on said reference voltage is less than said conduction level, said detector means including trigger means for emitting a switching pulse upon such detection, (c) and discharge means connected to said trigger means and to said capacitor, for discharging said capacitor from said first reference voltage to a second reference voltage in a period of time of the order of the period of said sync pulses upon receipt of a said switching pulse, including means for establishing said second reference voltage at a value such that the voltage of a said shifted sync pulse superimposed thereon is greater than said conduction level.

8. In a television receiving circuit, (a) a sync separator comprising (i) a transistor having base, emitter and collector electrodes, (ii) means biasing said transistor to conduct upon application of a voltage greater than a selected conduction level to said base, (iii) a capacitor connected to said base, (iv) means for maintaining a substantially steady first reference voltage across said capacitor, said means comprising (1) input means connected to said capacitor, for receiving and applying through said capacitor to said base a composite signal superimposed on said first reference voltage, said composite signal including a train of sync pulses, the voltage of a said sync pulse superimposed on said first reference voltage being greater than said conduction level, whereby to cause said transistor to conduct and charge said capacitor during a receipt of said sync pulses, (2) resistance means connected to said capacitor for discharging the same at a first relatively slow rate between sync pulses, (v) and output means connected to said transistor and sensitive to collector current therethrough for emitting output pulses corresponding to separated sync pulses, (b) a detector for detecting prolongation of a periodicity of said oput pulses consequent upon a sudden shift of sync pulses to a level such that the voltage of such shifted synch pulses superimposed on said reference voltage is less than said conduction level, and for emitting a switching pulse upon such detection, said detector comprising (i) means connected to said output means for peak rectifying said output pulses, (ii) and a trigger circuit connected to said peak rectifying means for emitting said switching pulse upon the level of the output from said peak rectifying means falling below a predetermined value, (c) and discharge means connected to said trigger circuit and to said capacitor for discharging said capacitor from said first reference voltage to a second reference voltage in a period of time of the order of the period of said sync pulses upon receipt of a said switching pulse, including means for establishing said second reference voltage at a value such that the voltage of a said shifted sync pulse superimposed thereon is greater than said conduction level.

9. A circuit according to claim 8, wherein said discharge means comprises (d) a series capacitor-resistor circuit for generating a voltage spike upon receipt of said switching pulse, (e) a rectifier and means reverse biasing said rectifier, said rectifier having one terminal connected to said first mentioned capacitor and being connected to receive said spike at its other terminal to overcome said bias to provide a path for discharge of said first mentioned capacitor through said rectifier and through said capacitor-resistor circuit at a rate determined by the relative values of said capacitors.

10. In a circuit of the type comprising (a) input means for an input signal including a train of regularly spaced pulses, (b) a capacitor connected to said input means, (c) charging means coupled to said capacitor for charging said capacitor during receipt of said pulses and discharge means for discharging said capacitor at a first relatively slow rate between said pulses, (d) said charging and discharge means including output means coupled to said capacitor and to said input means for generating an output signal upon occurrence of a predetermined relationship between the input signal and the voltage on said capacitor, said discharge means being connected to said capacitor for varying the charge thereon for maintaining said relationship during relatively gradual variations in said input signal, the improvement comprising (e) detector means coupled to said output means for detecting a change in said output signal indicative of a change in said predetermined relationship consequent upon a sudden change in the condition of said input signal, said detector including trigger means for emitting a switching pulse upon said detection, (f) and discharge means connected to said trigger means and to said capacitor and responsive to a said switching pulse, for discharging said capacitor at a second rate substantially faster than said first rate for rapid readjustment of said capacitor voltage, for rapid restoration of said relationship.

References Cited by the Examiner

UNITED STATES PATENTS

| | | | |
|---|---|---|---|
| 2,572,179 | 10/1951 | Moore | 328—137 X |
| 3,068,367 | 12/1962 | Brown et al. | |

FOREIGN PATENTS

| | | |
|---|---|---|
| 234,969 | 12/1959 | Australia. |
| 1,059,956 | 6/1959 | Germany. |

JOHN W. HUCKERT, *Primary Examiner.*